United States Patent
Lee et al.

(10) Patent No.: US 10,259,316 B2
(45) Date of Patent: Apr. 16, 2019

(54) STIFFNESS REINFORCEMENT DEVICE FOR FUEL TANK OF VEHICLE

(71) Applicants: Hyundai Motor Company, Seoul (KR); Kia Motors Corporation, Seoul (KR)

(72) Inventors: Bo Sung Lee, Daejeon (KR); Bu Yeol Ryu, Hwaseong-si (KR); Ju Tae Song, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/684,517

(22) Filed: Aug. 23, 2017

(65) Prior Publication Data

US 2018/0154769 A1  Jun. 7, 2018

(30) Foreign Application Priority Data

Dec. 6, 2016  (KR) .......................... 10-2016-0164820

(51) Int. Cl.
  *B60K 15/073*  (2006.01)
  *B60K 15/03*  (2006.01)

(52) U.S. Cl.
  CPC ...... *B60K 15/073* (2013.01); *B60K 15/03006* (2013.01); *B60K 2015/0344* (2013.01)

(58) Field of Classification Search
  CPC .............. B60K 15/073; B60K 15/077; B60K 15/03006; B60K 15/03; B65D 11/20; B65D 11/22; B65D 7/44; B65D 7/42
  USPC ....... 220/563, 562, 645, 653, 652, 651, 678, 220/677; 137/574, 571
  See application file for complete search history.

(56) References Cited

U.S. PATENT DOCUMENTS

| | | | | |
|---|---|---|---|---|
| 1,562,074 A * | 11/1925 | Baum | .................... | B64D 37/02 220/563 |
| 1,616,008 A * | 2/1927 | Stout | ..................... | B64D 37/02 220/563 |
| 2,860,809 A * | 11/1958 | Perry | ..................... | B65D 90/52 137/574 |
| 2,863,583 A * | 12/1958 | Trump | .................. | B64D 37/12 220/4.15 |
| 2,947,440 A * | 8/1960 | Slota | ..................... | B64D 37/06 220/4.15 |
| 3,610,457 A * | 10/1971 | Opalewski | ............. | B29C 33/14 220/563 |
| 4,611,724 A * | 9/1986 | Watkins | .................. | B60P 3/221 220/553 |
| 4,877,261 A * | 10/1989 | Heisson | .................... | B62B 1/18 210/464 |
| 5,960,981 A * | 10/1999 | Dodson | ................. | B65D 90/52 220/507 |

(Continued)

FOREIGN PATENT DOCUMENTS

GB  431477 A *  7/1935  ............... B65D 7/44

*Primary Examiner* — Robert J Hicks
(74) *Attorney, Agent, or Firm* — Morgan, Lewis & Bockius LLP

(57) ABSTRACT

A stiffness reinforcement device for a fuel tank of a vehicle may include a body including a pair of pillars formed at both lateral end portions of the body; an upper fusing portion molded to an upper part of the body integrally and fused to an upper plate of the fuel tank; and a lower fusing portion molded to a lower part of the body integrally and fused to a lower plate of the fuel tank.

7 Claims, 6 Drawing Sheets

(56) References Cited

U.S. PATENT DOCUMENTS 6,220,287 B1\* 4/2001 Wolf ..................... B64G 1/402
137/574

\* cited by examiner

STIFFNESS REINFORCEMENT DEVICE FOR FUEL TANK OF VEHICLE

CROSS-REFERENCE(S) TO RELATED APPLICATIONS

The present application claims priority to Korean Patent Application No. 10-2016-0164820, filed on Dec. 6, 2016, the entire contents of which are incorporated herein for all purposes by this reference.

BACKGROUND OF THE INVENTION

Field of the Invention

The present invention relates to a stiffness reinforcement device for the fuel tank of a vehicle, and more particularly, to a stiffness reinforcement device for the fuel tank of a vehicle which is capable of securing stiffness in positive or negative pressure states of the fuel tank while being capable of preventing damage which can cause fuel leakage in the event of collision.

Description of Related Art

According to the related art, a canister for collecting evaporation gas is mounted in a fuel tank for storing gasoline. The canister is connected to a purge line to which negative engine pressure is applied.

Accordingly, when negative engine pressure is applied to the fuel tank through the canister while an engine is being driven, evaporation gas collected in the canister is introduced into a combustion chamber of the engine through the purge line by the negative engine pressure and is combusted. Thus, the regulations of emission of evaporation gas may be satisfied.

Meanwhile, in the case of the fuel tank for a hybrid vehicle, the interior of the fuel tank is exposed to the atmosphere as occasion required (e.g., when refueling, when excessive internal pressure is formed in the fuel tank, when diagnosing leakage of the fuel tank, etc.), and, accordingly, excessive internal pressure in the fuel tank, which is caused by the evaporation of fuel, etc., is released.

Particularly, when the fuel tank for a hybrid vehicle is made from plastic materials and configured to have a sealed structure, a pillar-shaped stiffness reinforcement member is mounted in the fuel tank.

The stiffness reinforcement member may be integrally fused, at upper and lower surfaces thereof, to upper and lower plates of the fuel tank using thermal fusion. In the present case, the stiffness reinforcement member should be manufactured to have a structure and a shape capable of securing the desired stiffness, not only in a positive pressure state of the fuel tank (including an excessive internal pressure state), but also in a state in which negative engine pressure is applied.

In addition, the stiffness reinforcement member should be manufactured to have a shape and a structure capable of inducing fragmentation thereof in the event of an impact, such as a vehicle collision.

Accordingly, when a large impact such as a vehicle collision is applied to the plastic fuel tank, the fuel tank deforms to absorb the impact while a fracture inducing portion of the stiffness reinforcement member is fractured to absorb the impact.

However, when a large impact such as a vehicle collision is applied to the plastic fuel tank, the fusing portion between the upper plate of the fuel tank and the upper surface of the stiffness reinforcement member, or the fusing portion between the lower plate of the fuel tank and the lower surface of the stiffness reinforcement member is fractured (torn) and, accordingly, there may be a problem of fuel leakage from the fuel tank.

The information disclosed in this Background of the Invention section is only for enhancement of understanding of the general background of the invention and should not be taken as an acknowledgement or any form of suggestion that this information forms the related art already known to a person skilled in the art.

BRIEF SUMMARY

Various embodiments of the present invention relates to a stiffness reinforcement device for the fuel tank of a vehicle, wherein stiffness reinforcement members are made from plastic materials to be mounted in the fuel tank, and have an improved structure to not only maintain stiffness in a positive pressure state of the fuel tank and in a state in which an negative engine pressure is applied, but also to reduce damage and prevent fracture at fusing portions of upper and lower plates of the fuel tank when an impact including a vehicle collision occurs.

An aspect of Various aspects of the present invention are directed to providing a stiffness reinforcement device for the fuel tank of a vehicle which includes a body in which a pair of pillars are formed at both lateral end portions of the body; an upper fusing portion molded to an upper part of the body in an integrated manner and fused to an upper plate of the fuel tank; and a lower fusing portion molded to a lower part of the body in an integrated manner and fused to a lower plate of the fuel tank.

In an exemplary embodiment, each of the pillars may include a slot formed therethrough and the slot vertically extends.

In another exemplary embodiment, an upper surface area of the upper fusing portion and a lower surface area of the lower fusing portion may be equal to each other and be wider than a cross-sectional area of the body.

In still another exemplary embodiment, each of the pillars may include arch-shaped recesses formed at internal and external surfaces thereof.

In yet another exemplary embodiment, each of the pillars has an "H"-shaped cross-sectional structure with the slot interposed between opposite lateral portions thereof to have reinforced bending stiffness.

In still yet another exemplary embodiment, the body may further include a pair of partitions formed on an external surface of the body in an integrated manner to suppress displacement of fuel, and each of the partitions may be formed with through-holes to allow a partial displacement of fuel.

In still yet another exemplary embodiment, the body may further include stiffness-maintaining ribs formed at the parts of the body respectively corresponding to the upper and lower portions of the slot in an integrated manner.

Various aspects and exemplary embodiments of the invention are discussed infra.

It is understood that the term "vehicle" or "vehicular" or other similar term as used herein are inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
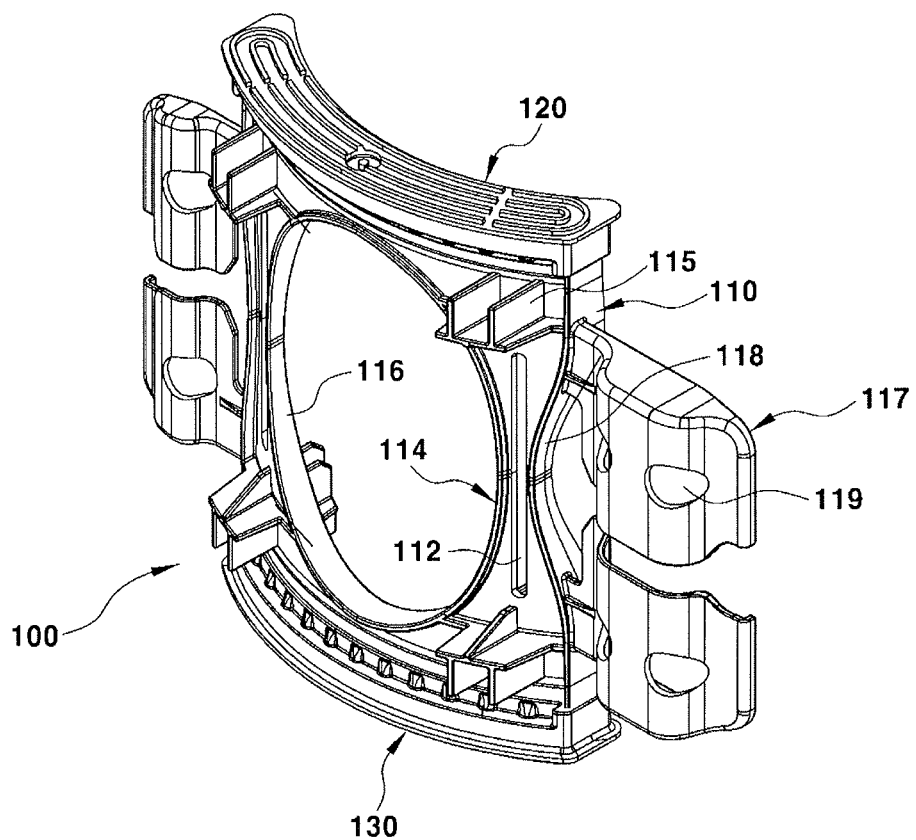
FIG. 1 is a perspective view illustrating a stiffness reinforcement device for a fuel tank of a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
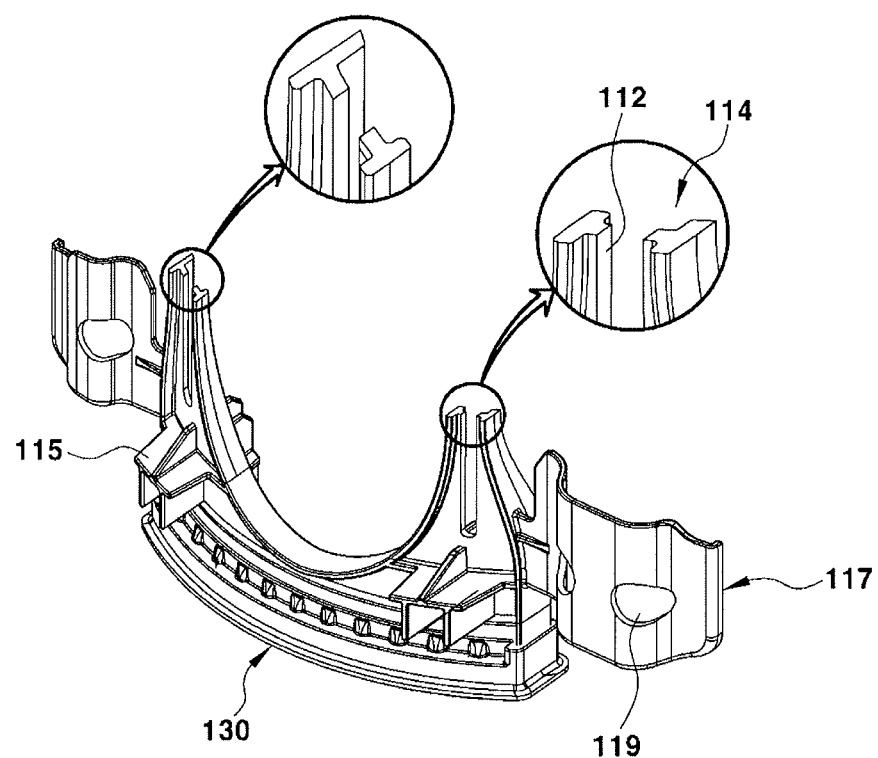
FIG. 2 is a horizontal cross-sectional view illustrating the stiffness reinforcement device according to an exemplary embodiment of the present invention.
Figure 3:
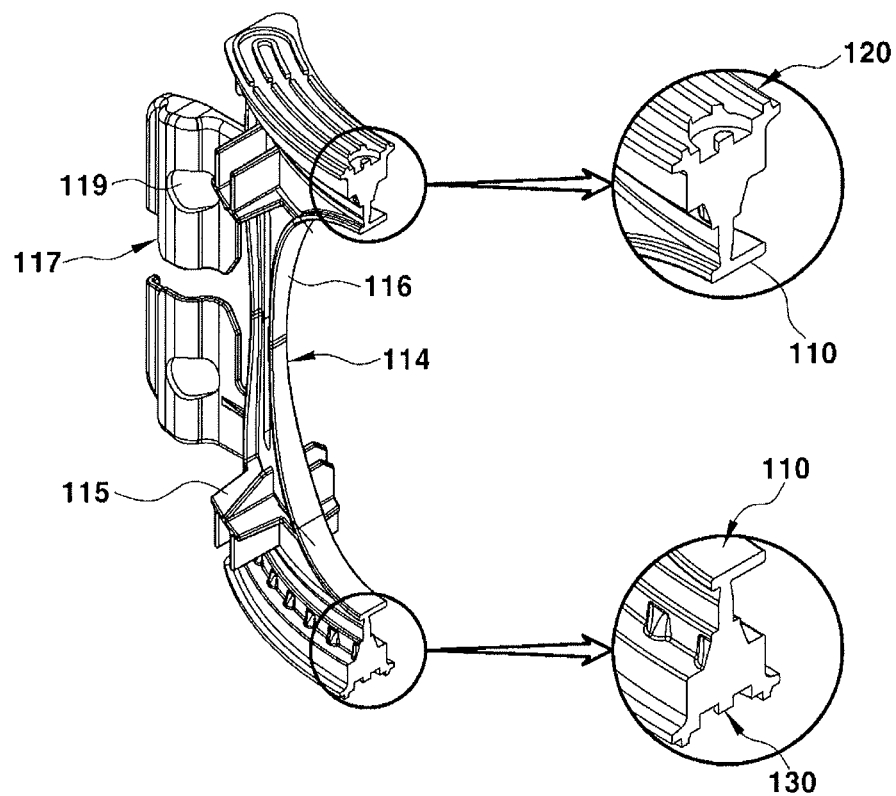
FIG. 3 is a vertical cross-sectional view illustrating the stiffness reinforcement device according to an exemplary embodiment of the present invention.

FIG. 1 is a perspective view illustrating a stiffness reinforcement device for the fuel tank of a vehicle according to an exemplary embodiment of the present invention. FIG. 2 and FIG. 3 are horizontal and vertical cross-sectional views, respectively.

In FIG. 1 to FIG. 3, reference numeral 100 denotes the stiffness reinforcement device according to an exemplary embodiment of the present invention, in detail, a stiffness reinforcement member.

The stiffness reinforcement member 100 is manufactured from a plastic material. The stiffness reinforcement member 100 includes a body 110 as a frame thereof and the body 110 is shown to have a round shape in a cross sectional view.

A pair of pillars 114 having slots 112 each extending through the pillars 114 in a vertical direction thereof is formed at both lateral end portions of the body 110 in an integrated manner.

Furthermore, an upper fusing portion 120 is formed at an upper part of the body 110 in an integrated manner and is fused to an upper plate 210 of a fuel tank 200 using a thermal fusion. A lower fusing portion 130 is formed at a lower part of the body 110 in an integrated manner and is fused to a lower plate 220 of the fuel tank 200 using a thermal fusion.

Figure 5:
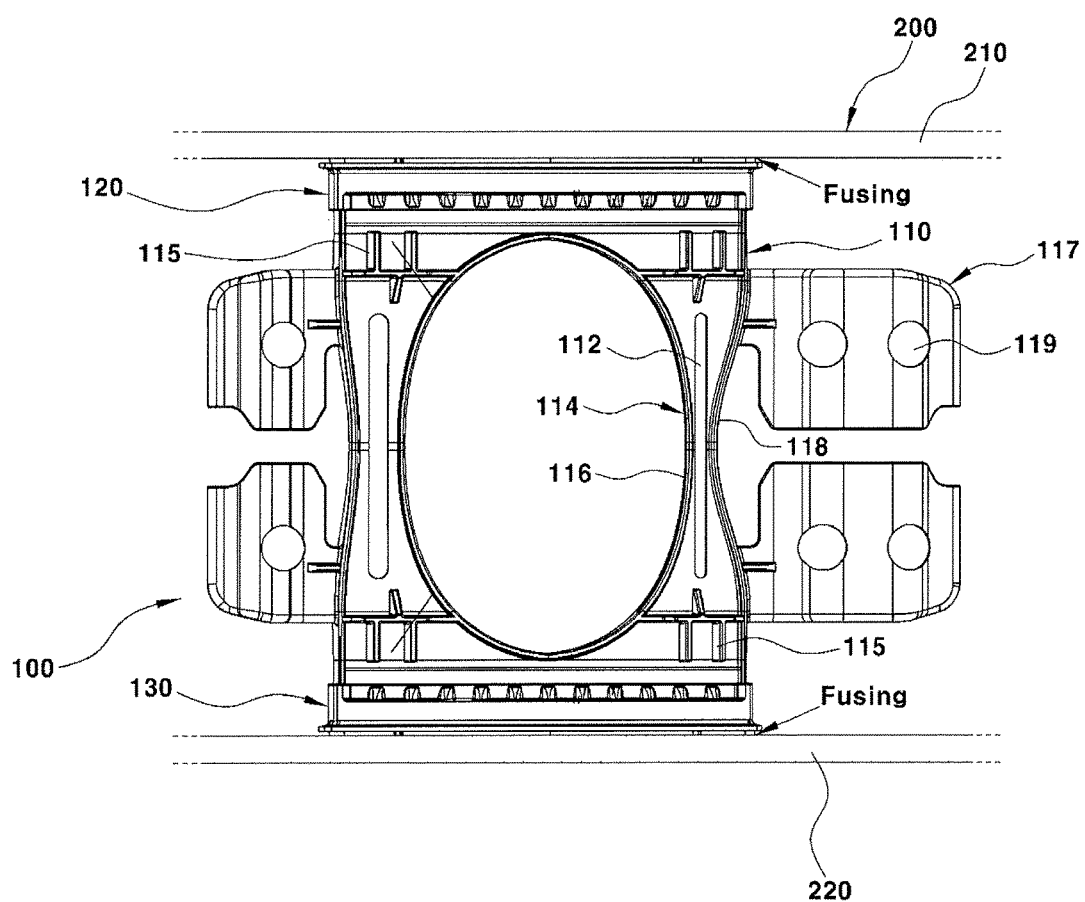
FIG. 5 is a front sectional view illustrating a state in which the stiffness reinforcement device according to an exemplary embodiment of the present invention is mounted in the fuel tank.
Figure 6:
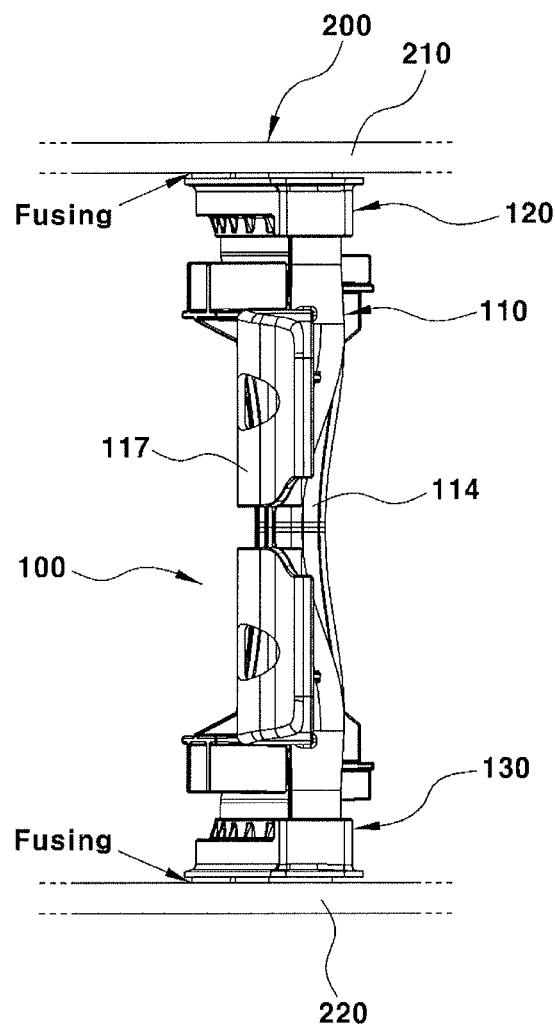
FIG. 6 is a lateral sectional view illustrating a state in which the stiffness reinforcement device according to an exemplary embodiment of the present invention is mounted in the fuel tank.

Referring to FIG. 5 and FIG. 6, mounting of the stiffness reinforcement member 100 of the present invention to the fuel tank 200 is achieved by fusing the upper fusing portion 120 formed at the upper part of the body 110 to the upper plate 210 of the fuel tank 200 in a thermal fusing manner and fusing the lower fusing portion 130 formed at the lower part of the body 110 to the lower plate 220 of the fuel tank 200 in the same manner as described above. Thus, the body 110 including the pillars 114 is configured to support both the upper and lower plates 210 and 220 of the fuel tank 200.

As the slots 112 are formed through the pillars 114, it may be possible to minimize the cross-sectional area of each pillar 114, wherein the pillars 114 are easily fractured when fracture pressure equal to or higher than a predetermined value is applied to the pillars 114 due to an impact including a vehicle collision.

The body 110 may have a large through-hole in the center thereof. In the present case, an arch-shaped recess 116 is formed at an internal surface of each pillar 114. In addition, an arched-shaped recess 118 is formed at an external surface of each pillar 114.

As the arch-shaped recesses 116 and 118 are formed at the internal surfaces and external surfaces of the pillars 114 respectively, the cross-sectional area of each pillar 114 may further be minimized to easily induce the fracture of the pillar 114.

As the cross-sectional areas of the pillars 114 are minimized through the slots 112 and the arch-shaped recesses 116 and 118, as described above, the pillars 114 may be easily fractured upon receiving fracture pressure equal to or higher than a predetermined value. However, the pillars 114 should maintain bending stiffness configured for supporting both the upper and lower plates 210 and 220 of the fuel tank 200 when the internal pressure of the fuel tank is in a positive pressure state (including being in an excessive internal pressure state) or when negative engine pressure is applied to the fuel tank.

To the present end, as illustrated in FIG. 2, the cross-sectional structure of each pillar 114 has an "H"-shape under the condition that the slot 112 is interposed between opposite lateral portions of the pillars and, accordingly, bending stiffness effectively supporting both the upper and lower plates of the fuel tank may be secured.

Stiffness-maintaining ribs 115 may be formed at parts of the body 110 respectively corresponding to upper and lower portions of each slot 112 integrally and, accordingly, bending stiffness effectively supporting both the upper and lower plates of the fuel tank may further be secured.

Meanwhile, as described above, the upper fusing portion 120 formed at the upper part of the body 110 is fused to the upper plate 210 of the fuel tank 200 through a thermal fusion. The lower fusing portion 130 formed at the lower part of the body 110 is also fused to the lower plate 220 of the fuel tank through the same method as described above.

In the present case, tearing may be generated at fusing areas between the fuel tank 200 and the fusing portions 120 and 130 by fracture pressure equal to or higher than a certain value. Therefore, sufficient fusing may be achieved between the fuel tank 200 and the fusing portions 120 and 130, wherein the fusing areas between the fuel tank 200 and the fusing portions 120 and 130 may have sufficient fusing strength (fusing strength configured for preventing tearing from being generated at the fusing areas due to fracture pressure).

To the present end, as illustrated in FIG. 3 and FIG. 6, the stiffness reinforcement member 100 is manufactured, wherein the upper surface area of the upper fusing portion 120 and the lower surface area of the lower fusing portion 130 are equal while being wider than the cross-sectional area of the body 110.

Accordingly, the contact and fusing area between the upper plate 210 of the fuel tank 200 and the upper fusing portion 120 may be increased, and the contact and fusing area between the lower plate 220 of the fuel tank 200 and the lower fusing portion 130 may be increased. Thus, sufficient fusing between the fuel tank 200 and the fusing portions 120 and 130 may be achieved and, as such, sufficient fusing strength is secured at the fusing areas between the fuel tank 200 and the fusing portions 120 and 130. Accordingly, it may be possible to prevent tearing from being generated at the fusing areas between the fuel tank 200 and the fusing portions 120 and 130 due to fracture pressure equal to or higher than a certain value, and thus to prevent fuel leakage.

Figure 4:
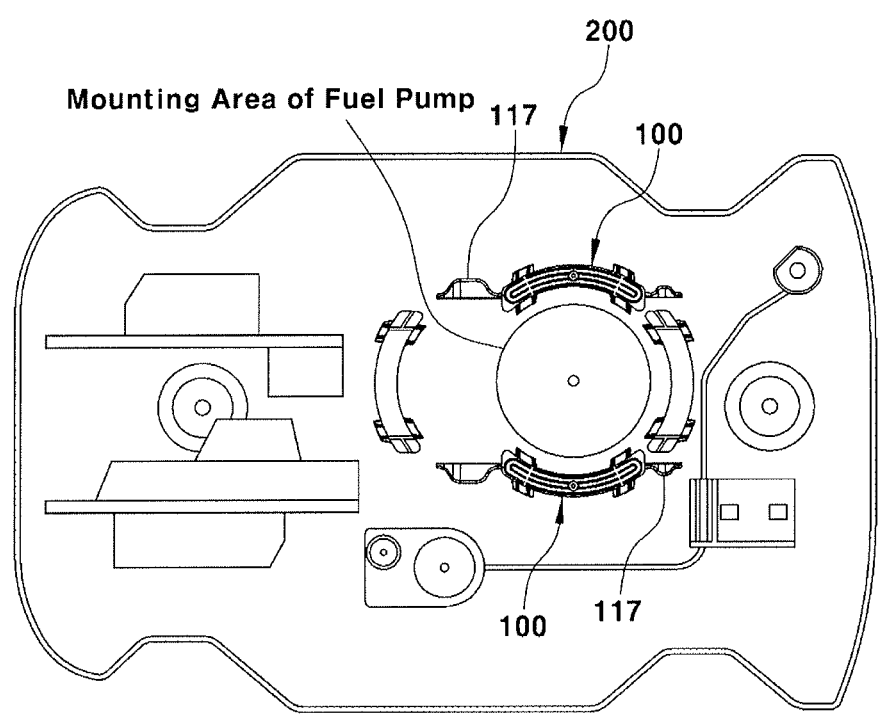
FIG. 4 is a perspective view illustrating a state in which the stiffness reinforcement device according to an exemplary embodiment of the present invention is disposed in a fuel tank.

Meanwhile, as illustrated in FIG. 4, the stiffness reinforcement member 100 of the present invention may be mounted in the fuel tank 200 around an area where a fuel pump is mounted. The present end is because the area where the fuel pump is mounted and areas therearound have poorer stiffness than other areas of the fuel tank as a fuel outlet line extending from the fuel pump to the engine is coupled to the fuel tank 200 through the upper plate 210 above the fuel pump.

As each pillar 114 is formed to have an "H"-shaped cross-sectional structure, and the stiffness-maintaining ribs 115 are formed at the body 110, as described above, it may be possible to effectively support both the upper and lower plates 210 and 220 of the fuel tank 200 when the internal pressure of the fuel tank 200 is in a positive pressure state or when negative engine pressure is applied to the fuel tank 200.

Furthermore, when a large impact including a vehicle collision is applied to the plastic fuel tank 200 while fracture pressure is applied to the pillars 114. The pillars 114 absorb the impact while being easily fractured since each pillar 114 has a minimized cross-sectional area by the slot 112 and the recesses 116 and 118.

Particularly, when the fuel tank 200 absorbs an impact (fracture pressure) including a vehicle collision, the fuel tank 200 is deformed by the impact, and the pillars 114 are easily fractured. As a result, the fuel tank 200 may maintain a sealed state. In addition, fracture of the areas between the fusing portions 120 and 130 and the upper and lower plates 210 and 220 of the fuel tank 220 may be prevented and, as such, fuel leakage caused by such fracture may be prevented.

Meanwhile, a pair of partitions 117 is formed on an external surface of the body 110 integrally to suppress displacement of fuel. Fuel-through-holes 119 are formed through the partitions 117 to allow a partial displacement of fuel.

Accordingly, when the vehicle vibrates during travel thereof, when the vehicle travels on an inclined road, or when a vehicle collision occurs, the partitions 117 are configured to suppress the displacement of fuel in the fuel tank 200. Furthermore, when the displacement pressure of fuel, which decreases durability of the partitions 117, is applied to the partitions 117 a portion of fuel passes through the fuel-through-holes 119 decreasing displacement pressure of fuel applied to the partitions 117.

As is apparent from the above description, according to an exemplary embodiment of the present invention, there are advantages as below.

First, stiffness of the stiffness reinforcement member may be maintained in a positive pressure state of the fuel tank and in a state in which negative engine pressure is applied to the fuel tank.

Second, the pillars of the stiffness reinforcement member may easily be fractured by impact (fracture pressure) including a vehicle collision. Accordingly, fracture of the fusing portions between the stiffness reinforcement member and the upper and lower plates of the fuel tank may be prevented and, Accordingly, it may be possible to prevent fuel leakage.

Third, partitions may further be disposed at the stiffness reinforcement member to suppress displacement of fuel and, as such, it may be possible to suppress the displacement of fuel when the vehicle vibrates, when the vehicle travels on an inclined road, or when a vehicle collision occurs.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaust or to limit the invention to the precise forms disclosed, and obviously many modifications and variations are possible in light of the above teachings. The exemplary embodiments were chosen and described to explain certain principles of the invention and their practical application, to thereby enable others skilled in the art to make and u various exemplary embodiments of the present invention, as well as various alternatives and modifications thereof. It is intended that the scope of the invention be defined by the Claims appended hereto and their equivalents.

What is claimed is:

1. A stiffness reinforcement device for a fuel tank of a vehicle comprising:
   a body including a pair of pillars formed at first and second lateral end portions of the body;
   an upper fusing portion molded to an upper part of the body integrally and fused to an upper plate of a fuel tank; and
   a lower fusing portion molded to a lower part of the body integrally and fused to a lower plate of the fuel tank,
   wherein each of the pillars includes a slot that is formed through the pillars and extends in a vertical direction thereof, wherein each of the pillars includes arch-shaped recesses formed at internal and external surfaces of each of the pillars, and wherein the body has a through-hole in the center thereof.

2. The stiffness reinforcement device according to claim 1, wherein the upper and lower fusing portions respectively have upper and lower surface areas equal to each other while being wider than a cross-sectional area of the body.

3. The stiffness reinforcement device according to claim 1, wherein each of the pillars has an "H"-shaped cross-sectional structure to reinforce bending stiffness of each pillar.

4. The stiffness reinforcement device according to claim 1, wherein the body further includes partitions formed on an external surface of the body at upper and lower end portions of the body integrally, to suppress displacement of fuel.

5. The stiffness reinforcement device according to claim 4, wherein each of the partitions is formed with fuel-through-holes to allow a partial displacement of fuel.

6. The stiffness reinforcement device according to claim 1, wherein the body further includes stiffness-maintaining ribs formed at portions of the body respectively corresponding to upper and lower portions of each slot integrally.

7. The stiffness reinforcement device according to claim 1, wherein the arch-shaped recesses includes:
   a first arch-shaped recess depressed at the internal surface of each of the pillars; and
   a second arch-shaped recess depressed at the external surface of each of the pillars toward the first arch-shaped recess.

* * * * *